United States Patent Office 2,778,747
Patented Jan. 22, 1957

2,778,747

PROCESS OF PREPARING TRIALLYL PHOSPHATE-POLYHALOMETHANE POLYMERS AND PROCESS OF FLAMEPROOFING TEXTILE THEREWITH

Jeremiah William Weaver, New Orleans, La., assignor to the United States of America as represented by the Secretary of Agriculture No Drawing. Application January 13, 1954,
Serial No. 403,943

7 Claims. (Cl. 117—136)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to non-combustible, crosslinked, liquid or solid, polymeric addition products having a molecular weight greater than about 800. This application is a continuation in part of my co-pending application, Serial No. 253,441, filed October 26, 1951, abandoned January 13, 1954.

The polymeric addition products provided by this invention are the products of an addition reaction between a polymerizable trialkenyl phosphate and a polyhalomethane containing at least two halogen atoms of the group chlorine and bromine.

A particularly valuable class of the addition products comprises the products of such a reaction employing from about 1/3 to 4/5 moles of a polyhalomethane containing at least 3 halogen atoms of the group chlorine and bromine per mole of triallyl phosphate. The reoccurring structural units of the molecule of an addition product of this class are

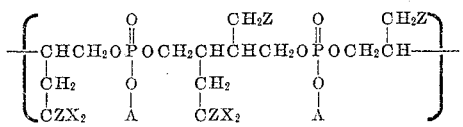

and

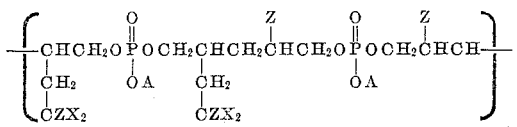

wherein A represents an allyl or a —CH₂CHZCH₂CZX₂ radical, X represents a chlorine or bromine atom, and Z represents a hydrogen, chlorine, or bromine atom.

The polymeric addition products provided by this invention can be prepared in the form of solid polymers, which are soluble in the ethylene chloride-methyl alcohol azeotrope boiling at about 61° C. (This azeotrope is hereinafter referred to simply by the term "the azeotrope.") Such polymers, when they are dispersed on the surfaces of organic combustible materials having a natural or artificial cellulosic fibrous character, render the organic materials flameproof. Examples of materials which can be flameproofed by application of such polymers include, textile materials such as cotton or rayon fibers, yarns or fabrics; braided materials such as ropes and cords; and paper, and the like materials.

Substantially any polymerizable polyolefinic neutral organic ester of phosphoric acid can be used in the processes provided by the present invention. A preferred class of such esters consist of those in which three terminally unsaturated allylic radicals are attached to each phosphate radical, i. e., esters such as triallyl, trimethallyl, or triethallyl, and the like phosphates or diallyl, methallyl, ethallyl dimethallyl, and the like mixed phosphates. Triallyl phosphate is typical of such phosphates, and is an ester which is particularly suitable for employment in the present processes. (For simplicity of language, the polymerizable polyolefinic neutral organic esters of phosphoric acid will be referred to simply as "phosphates.")

The polyhalomethanes suitable for employment in the present process are derivatives of methane in which at least two hydrogen atoms are replaced by atoms of chlorine or bromine. This class of compounds includes compounds of the formula, $CBr_4$, $CBr_3Cl$, $CBr_2Cl_2$, $CBrCl_3$, $CBr_3H$, $CBr_2H_2$, $CCl_4$, $CCl_3H$, and $CCl_2H_2$. (The compounds of this class will hereinafter be referred to simply by the term "halomethane.") The halomethanes having a molecular weight above 150 have been found to be particularly suitable for employment in the process of the present invention. Bromoform and bromine-containing "perhalo methanes" (those in which all of the hydrogen have been replaced by halogen atoms) in which the halogen atoms are chlorine or bromine atoms, i. e., $CBr_4$, $CBr_3Cl$, $CBr_2Cl_2$ and $CBrCl_3$, are especially suitable polyhalomethanes for employment in the present process.

The reaction between the phosphate and the halomethane is initiated by the action of an organic peroxide at its decomposition temperature. The hydroperoxides, the dialkyl peroxides, the peresters, and the like peroxides, conventionally employed as catalyst or initiators of free radical polymerization reactions can be employed to initiate this reaction. Dibenzoyl peroxide, di-tertiary-butyl peroxide, and 2,2-bis (di-tertiary-butylperoxy) butane are particularly suitable for such employment.

The initial stages of the reaction are strongly exothermic, and a particularly suitable method of combining the reagents involves mixing the phosphate with a portion of the halomethane to be used, heating the mixture to the temperature best suited for the peroxide to be employed, and slowly introducing a solution consisting of the remainder of the halomethane and the peroxide to be used in beta,beta'-dichlorodiethyl ether.

The mixture of partially reacted phosphate, halomethane, and peroxide formed by initiating the reaction between the phosphate and the halomethane, is heated in the presence of a polymerization catalyst until solid polymers soluble in the azeotrope are produced. The presence of such solid polymers in the reaction mixture is evidenced by the marked increase in viscosity. The polymerization times and temperatures best suited for an economic production of the compositions can readily be determined for any particular halomethane, phosphate, peroxide, and additional polymerization catalyst employed. In general, moderately elevated temperatures, i. e., from about 50 to 100° C. are preferred although temperatures up to the decomposition temperature of some component other than the peroxide can be used.

The reactions involved in the process of the present invention can be conducted in the presence or absence of a solvent. Any of the solvents conventionally used in peroxide catalyzed polymerization reactions, e. g., nitrobenzene, the halogenated hydrocarbons and ethers, and the like, can be used. Di-(2-chloroethyl) ether is an especially suitable solvent for use in the present process. It is a solvent for the compositions produced.

With certain bromine free halomethanes, such as carbon tetrachloride, the reaction between the halomethane and the phosphate can be initiated with a peroxide at its decomposition temperature (for example by dibenzoyl peroxide at about 90° C.) and the resulting mixture can be polymerized until solid polymers soluble in the azeotrope are produced by merely maintaining the mixture at about the same temperature.

However, in the production of solid polyaddition products of triallyl phosphate and a bromine-containing perhalomethane, it is necessary to subject the liquid mixture formed by reacting the phosphate and such a halomethane in the presence of a peroxide to further reaction by heating the mixture in the presence of a Friedel-Crafts type catalyst. While any of the active Friedel-Crafts catalysts, such as aluminum trichloride, boron trifluoride, antimony pentachloride, and the like, can be used, the use of aluminum trichloride is preferred.

The solid polymeric addition products can be isolated by removing them from the reaction mixture in which they are produced by any of the conventional methods of removing solid compounds from a liquid mixture. A preferred method consists of diluting the reaction mixture with a volatile organic solvent in which the compositions are insoluble. Suitable solvents for use in such a separation procedure include the normally liquid hydrocarbons and ethers, e. g., saturated aliphatic hydrocarbons such as the pentanes or hexanes, or diethyl ether. Diethyl ether is especially suitable.

In general, the liquid polymeric addition products having a molecular weight in the order of about 800 are insoluble in the above solvents and can be isolated from the reaction mixture in which they are produced by diluting the mixture with such a solvent and decanting the liquid polymeric addition product. These liquid addition products are non-volatile liquids which are soluble in numerous polar organic solvents such as di(2-chloroethyl) ether, ketones such as acetone, methylethyl ketone and the like, liquid esters such as the butyl and amyl acetates, the Cellosolves and the like. These liquid polymeric addition products are resistant to further polymerization except in the presence of a Friedel-Crafts type catalyst and are useful as plasticizers for vinyl resins and the like and as components of varnishes, surface coating compositions, and the like; particularly where a resistance to combustion is desirable.

The proportions of the reactants can be varied widely in the process of the present invention. The capacity of the solid compositions to impart flameproofing has been demonstrated for compositions containing widely varying amounts of halogen. In general, the halomethane is preferably employed in a ratio of from 1/3 to 4/3 moles per mole of the phosphate, the peroxide reaction initiator in an amount of from about 0.5 to 2 percent by weight based on the weight of the phosphate, and the Friedel-Crafts polymerization catalyst, where employed, in an amount of from 0.5 to 2 percent by weight based on the weight of the phosphate.

While in general the compositions provided by the processes of the invention are soluble in di(2-chloroethyl) ether and in some other organic solvents, (as well as in the azeotrope) they are preferably applied to an organic material to be flameproofed by: impregnating the material with a solution of the compositions in the azeotrope, and evaporating the azeotrope from the impregnated material. Solutions containing from 20 to 30 parts by weight of the compositions per 100 parts of the azeotrope, have been found to be particularly convenient for use in applying the flameproofing compositions to textiles which can readily be impregnated to a 75 to 100% wet pick-up. In addition to being valuable flameproofing materials, the compositions are novel and valuable, flameproof, substantially colorless, thermosetting plastics which are suitable for substantially any of the conventional applications of thermosetting plastics.

The following experimental results are presented to illustrate in more detail certain features involved in the practice of this invention.

The ability of the compositions to impart flameproofing was, in each case, tested by impregnating cotton cloth with a solution consisting of from about 20 to 30 parts by weight of the composition per 100 parts of the azeotrope, removing the excess liquid by passing the impregnated material through padding rolls, drying the cloth at a moderately elevated temperature and subjecting it to the Army flameproofing test, CCC-T-191a.

*Example 1.—The use of carbon tetrabromide*

A mixture of 35 grams of triallylphosphate, 20 grams of carbontetrabromide, and 35 grams of beta,beta'-dichlorodiethyl ether was heated to 90° C. Dibenzoyl peroxide was added in small increments until 1.5 grams had been added. After the mixture had been heated at 90° C. for 12 hours there was no appreciable change in viscosity, indicating that little if any polymerization had taken place. A solution of 1.5 grams of aluminum trichloride in 20 milliliters of beta,beta'-dichlorodiethyl ether was slowly added. In 10 minutes the reaction mixture had the appearance of a viscous syrup. The mixture was poured into diethyl ether and the solids were separated. A yield of 25 grams of solid (45 percent) was obtained. The product was found to contain 39.7 percent bromine, and was soluble in the azeotrope.

Cotton twill impregnated with the product to a 19 percent pick-up (dry weight) was found to be flameproof.

*Example 2.—The use of carbon tetrachloride*

A mixture of 50 grams of triallyl phosphate, 33 grams of carbon tetrachloride, 30 grams of beta-beta'-dichlorodiethyl ether, and 0.7 gram of dibenzoyl peroxide was reacted at 90° C. for three hours in the manner described in Example 1. The reaction mixture so produced had the appearance of a viscous syrup. The reaction mixture was poured into diethyl ether and the solids were separated. A yield of 33 grams of solid (40 percent) was obtained. The product was found to contain 12.6 percent phosphorus and 11.2 percent chlorine.

Cotton twill impregnated with the product of a 30 percent pick-up (dry weight) was found to be flameproof.

*Example 3.—The use of dibromodichloromethane*

A mixture of 100 grams of triallyl phosphate, 50 grams of dibromodichloromethane, 100 grams of beta,beta'-dichlorodiethyl ether, and 2 grams of dibenzoyl peroxide was reacted at 90° C. for three hours in the manner described in Example 1. The reaction mixture exhibited no evidence of polymerization. A mixture of two grams of aluminum trichloride in 15 milliliters of beta,beta'-dichlorodiethyl ether was added in the manner described in Example 1. The reaction mixture gelled in two hours. It was worked up in diethyl ether and a yield of 67 grams of solid (44 percent) was obtained.

Cotton twill impregnated with the composition, to a 30 percent pick-up (dry weight), was found to be flameproof.

*Example 4.—The use of bromotrichloromethane*

A mixture of 100 grams of triallyl phosphate, 50 grams of bromotrichloromethane, 100 grams of beta,beta'-dichlorodiethyl ether, and 2 grams of benzoyl peroxide was reacted at 90° C. for 3 hours in the manner described in Example 1. The reaction mixture exhibited no evidence of polymerization. A solution of two grams of aluminum trichloride in 15 milliliters of beta,beta'-dichlorodiethyl ether was added in the manner described in Example 1. The reaction mixture gelled in two hours. It was worked up in diethyl ether and a yield of 56 grams (38 percent) of solids was obtained.

Cotton twill impregnated with the composition to a 30 percent pick-up (dry weight) was found to be flameproof.

*Example 5.—The use of bromoform*

A mixture of 100 grams of triallyl phosphate, 80 grams of bromoform, 100 grams of beta,beta'-dichlorodiethyl ether and 1.8 grams of benzoyl peroxide was reacted at 90° C. for 3 hours in the manner described in Example 1. The reaction mixture evidenced no polymerization.

A solution of 1.8 grams of aluminum chloride in 15 milliliters of beta,beta'-dichlorodiethyl ether was added in the manner described in Example 2. A yield of 17.6 grams of (10 percent) of solids containing 28.6 percent bromine was obtained.

A cotton twill impregnated with the composition was found to be flameproof.

*Example 6.—The unsuitability of related halo-hydrocarbons*

Employing reaction processes entirely analogous to those described in the preceding examples, solid materials were prepared from, respectively, 1,2-dichloroethane, and symmetrical-tetrachloroethane.

When cotton twill was impregnated, in the manner described above, with these compositions, it was found not to be flameproof.

*Example 7.—The isolation of liquid addition products*

A mixture of 100 grams of triallyl phosphate, 70 grams of bromoform, 100 grams of beta,beta'-dichloroethyl ether and 1.8 grams of benzoyl peroxide were reacted for 3 hours at 90° C. in the manner described in Example 1.

The reaction mixture was poured into about 500 mls. of petroleum ether. The liquid addition product immediately settled to the bottom in the form of an immiscible liquid phase and was isolated by decantation. The isolated liquid addition product was a pale amber, slightly viscous, non-volatile liquid which was soluble in polar organic solvents such as beta,beta'-dichloroethyl ether.

The molecular weight of the liquid addition product was determined, by the lowering of the freezing point of benzene method, and found to be about 840.

I claim:

1. A process comprising reacting a mixture of triallyl phosphate, a halomethane wherein the halogen group consists of chlorine, and an organic peroxide at the decomposition temperature of the organic peroxide, polymerizing the reaction mixture so produced by maintaining it at a moderately elevated temperature until solid polymers which are soluble in the ethylene chloride-methyl alcohol azeotrope which boils at 61° C. are produced, and isolating the solid polymers.

2. A process comprising reacting a mixture of triallyl phosphate, a halomethane wherein the halogen group contains at least one bromine atom, and an organic peroxide at the decomposition temperature of the organic peroxide, polymerizing the reaction mixture so produced by introducing a catalytic amount of a Friedel-Crafts catalyst and maintaining the resulting mixture at a moderately elevated temperature until solid polymers which are soluble in the ethylene chloride-methyl alcohol azeotrope which boils at 61° C. are produced, and isolating the solid polymers.

3. The process of claim 2 wherein the halomethane is carbon tetrabromide.

4. The process of claim 2 wherein the Friedel-Crafts catalyst is aluminum trichloride.

5. The process of claim 2 wherein the organic peroxide is dibenzoyl peroxide, the reaction is conducted at about 90° C., di(2-chloroethyl) ether is employed as a solvent for the reactants, and the products are precipitated by diluting the reaction mixture with diethyl ether.

6. The process of flameproofing a combustible organic textile which comprises impregnating the textile with a solution consisting essentially of a polymer produced by the process of claim 1 dissolved in the ethylene chloride-methyl alcohol azeotrope which boils at 61° C., and evaporating the azeotrope.

7. The process of flameproofing a combustible organic textile which comprises impregnating the textile with a solution consisting essentially of a polymer produced by the process of claim 2 dissolved in the ethylene chloride-methyl alcohol azeotrope which boils at 61° C., and evaporating the azeotrope.

References Cited in the file of this patent

UNITED STATES PATENTS

| | | |
|---|---|---|
| 2,660,542 | Walter et al. | Nov. 24, 1953 |
| 2,660,543 | Walter et al. | Nov. 24, 1953 |
| 2,686,768 | Frick et al. | Aug. 17, 1954 |